United States Patent
Xing et al.

(10) Patent No.: US 12,069,058 B2
(45) Date of Patent: Aug. 20, 2024

(54) SECURITY MECHANISMS FOR CONTENT MANAGEMENT SYSTEMS

(71) Applicant: Dropbox, Inc., San Francisco, CA (US)

(72) Inventors: Kerry Xing, San Francisco, CA (US); Raghav Sharma, San Francisco, CA (US); Bradley Girardeau, San Francisco, CA (US); Maxime Serrano, San Francisco, CA (US); Ruslan Nigmatullin, Mountain View, CA (US); Soumit Rahman, San Francisco, CA (US); Sergey Petrenko, San Mateo, CA (US); Tobias Kohlenberg, Portland, OR (US)

(73) Assignee: Dropbox, Inc., San Francisco, CA (US)

( * ) Notice: Subject to any disclaimer, the term of this patent is extended or adjusted under 35 U.S.C. 154(b) by 530 days.

(21) Appl. No.: 17/301,149

(22) Filed: Mar. 26, 2021

(65) Prior Publication Data

US 2022/0311772 A1    Sep. 29, 2022

(51) Int. Cl.
*H04L 9/40* (2022.01)
*G06F 21/62* (2013.01)

(52) U.S. Cl.
CPC ........ *H04L 63/101* (2013.01); *G06F 21/6218* (2013.01); *H04L 63/104* (2013.01)

(58) Field of Classification Search
CPC . H04L 63/101; H04L 63/104; G06F 21/6218; G06F 21/6245; G06F 2221/2141
See application file for complete search history.

(56) References Cited

U.S. PATENT DOCUMENTS

| | | | |
|---|---|---|---|
| 8,065,417 B1 | 11/2011 | Richardson et al. | |
| 2009/0254561 A1* | 10/2009 | Shao | H04L 67/306 |
| | | | 707/999.009 |
| 2011/0058675 A1 | 3/2011 | Brueck et al. | |
| 2011/0131175 A1* | 6/2011 | Kawai | G06F 40/103 |
| | | | 707/E17.008 |
| 2011/0173168 A1 | 7/2011 | Jones et al. | |
| 2013/0304765 A1* | 11/2013 | Failelson | G06F 21/6236 |
| | | | 707/785 |
| 2015/0205977 A1* | 7/2015 | Rundle | G06F 21/6227 |
| | | | 707/781 |
| 2017/0041296 A1 | 2/2017 | Ford et al. | |
| 2017/0255790 A1 | 9/2017 | Barrett et al. | |
| 2020/0387598 A1* | 12/2020 | El-Moussa | G06F 21/53 |
| 2021/0064766 A1* | 3/2021 | Beno | G06F 21/604 |
| 2022/0188273 A1* | 6/2022 | Koorapati | G06F 16/958 |

* cited by examiner

*Primary Examiner* — Han Yang
(74) *Attorney, Agent, or Firm* — Polsinelli PC

(57) ABSTRACT

A system and method for protecting information managed by a content management system are disclosed herein. A first server of the content management system receives a request from a user or service to access a data item managed by the content management system. The first server determines a data type associated with the requested data item. The first server accesses a access control list to determine whether the user or service has permission to access data associated with the data type. The first server processes the request, based on a determination that the user or service has permissions to access data associated with the data type.

16 Claims, 9 Drawing Sheets

| Read Permissions | | |
|---|---|---|
| Service/User | Data Type | |
| Service 1 | Type 1 | |
| Service 2 | Type 2 | |
| ... | ... | |
| User 1 | Type 1 | |
| Write Permissions | | |
| Service/User | Data Type | |
| Service 1 | Type 3 | |
| Service 2 | Type 2 | |
| ... | ... | |
| User 1 | Type 1 | |

FIG. 4A

| | | |
|---|---|---|
| Service/User 1 | Read Permissions | Type 1, Type 2 |
| | Write Permissions | Type 1 |
| Service/User 2 | Read Permissions | Type 1 |
| | Write Permissions | None |
| Service/User 3 | Read Permissions | Type 1, Type 2, Type 3, Type 4 |
| | Write Permissions | Type 1, Type 2 |

FIG. 4B

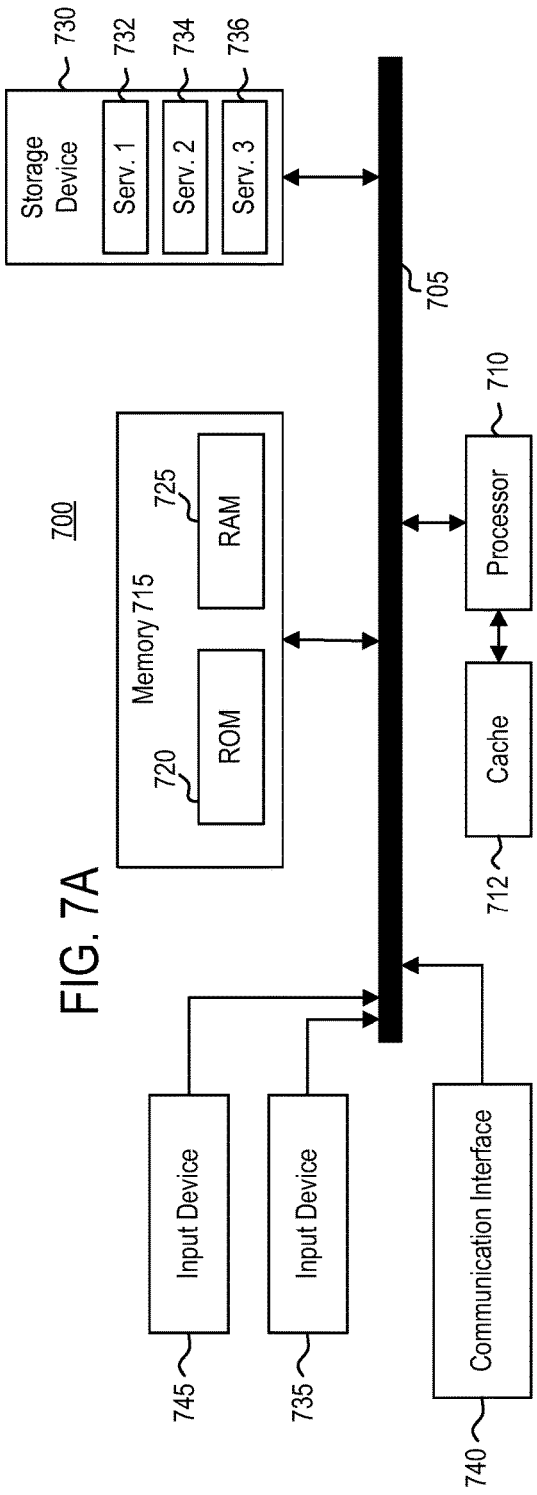
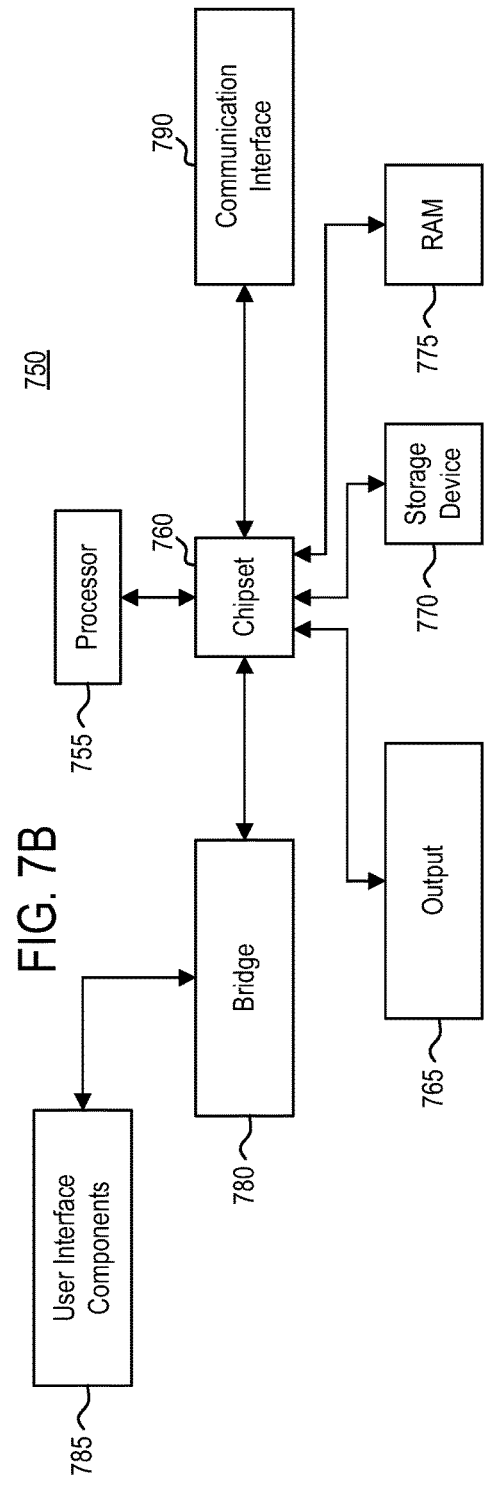
FIG. 7A
FIG. 7B

SECURITY MECHANISMS FOR CONTENT MANAGEMENT SYSTEMS

TECHNICAL FIELD

The present system relates to security systems and methods, and more particularly, it relates to protecting information managed by a content management system.

BACKGROUND

A multi-user network-based content management system allows users to upload and store content items in a data storage medium associated with an account, which the users may then access from virtually any network-enabled computing device. As the number of users and content items increases in such a storage environment, so too does the sensitive data that is managed by the content management system. As such, the content management system becomes more vulnerable to attackers who may wish to access this privileged information.

SUMMARY

In some embodiments, a method is disclosed herein. A content management system receives a first request from a user or service to access a first data item stored on a first server of the content management system. The content management system determines a first data type associated with the first data item. The content management system accesses a access control list to determine whether the user or service has permission to access data associated with the first data type. The content management system processes the first request, based on a first determination that the user or service has permission to access data associated with the first data type. The content management system receives a second request from the user or service to access a second data item stored on the first server of the content management system. The content management system determines a second data type associated with the second data item. The content management system accesses the access control list to determine whether the user or service has permission to access data associated with the second data type. The content management system rejects the second request, based on a second determination that the user or service does not have permission to access data associated with the second data type.

In some embodiments, a method is disclosed herein. A content management system receives a first request from a first user or service to access a data item managed by the content management system. The content management system determines a data type associated with the data item. The content management system accesses a access control list to determine whether the first user or service has permission to access data associated with the data type. The content management system processes the first request, based on a first determination that the first user or service has permission to access data associated with the data type. The content management system receives a second request from a second user or service to access the data item. The content management system accesses the access control list to determine whether the second user or service has permission to access data associated with the data type. The content management system rejects the second request, based on a second determination that the second user or service does not have permission to access data associated with the data type.

In some embodiments, a non-transitory computer readable medium is disclosed herein. The non-transitory computer readable medium includes instructions which, when executed by a computing system, cause the computing system to perform operations. The operations include receiving, by a first server of a content management system, a request from a user or service to access a data item managed by the content management system. The operations further include determining, by the first server, a data type associated with the requested data item. The operations further include accessing, by the first server, a access control list to determine whether the user or service has permission to access data associated with the data type. The operations further include processing, by the first server, the request, based on a determination that the user or service has permissions to access data associated with the data type.

BRIEF DESCRIPTION OF THE DRAWINGS

The above-recited and other advantages and features of the disclosure will become apparent by reference to specific embodiments thereof, which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings.

FIG. 4A is a block diagram illustrating an access control list, according to example embodiments.

FIG. 4B is a block diagram illustrating an access control list, according to example embodiments.

FIG. 7A illustrates an example system configuration for implementing various embodiments of the present technology, according to example embodiments.

FIG. 7B illustrates an example system configuration for implementing various embodiments of the present technology, according to example embodiments.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The one or more techniques disclosed herein address the need in the art for controlling user and/or service access to sensitive data stored in association with a content management system. A data store associated with content management system may be a particularly attractive target for an attacker because the data store stores many types of sensitive information, such as, but not limited to, personal identification information, user comments, file history, shared link data, and the like. In conventional content management systems, if an attacker is able to breach a computing system of a plurality of computing systems hosting the data store, the attacker could simply access the data store and extract whatever information they desire through remote procedure calls.

As companies and user continue to rely on cloud computing systems for storage and retrieval of data (e.g., sensitive data), these companies and users may appear vulnerable to malicious attackers. To prevent attackers from being able to access the data store, or at the very least, to prevent attackers from being able to access the entire contents of the data store, the one or more techniques described herein leverage an access control list to control user or service access to particular data types stored in a database associated with content management system. In other words, control list may define which users or services can access which types of data managed by the data store. In this manner, the access control list may limit which users or services may submit read/write requests data. Otherwise, any client may make a remote procedure call to the data store for any type of data. With the access control list that the data types that users or services can access, even if an attacker is able to gain access to a particular computing device, the attacker would need to move laterally and further break into a chain of computing devices before being able to access the sensitive data.

Figure 1:
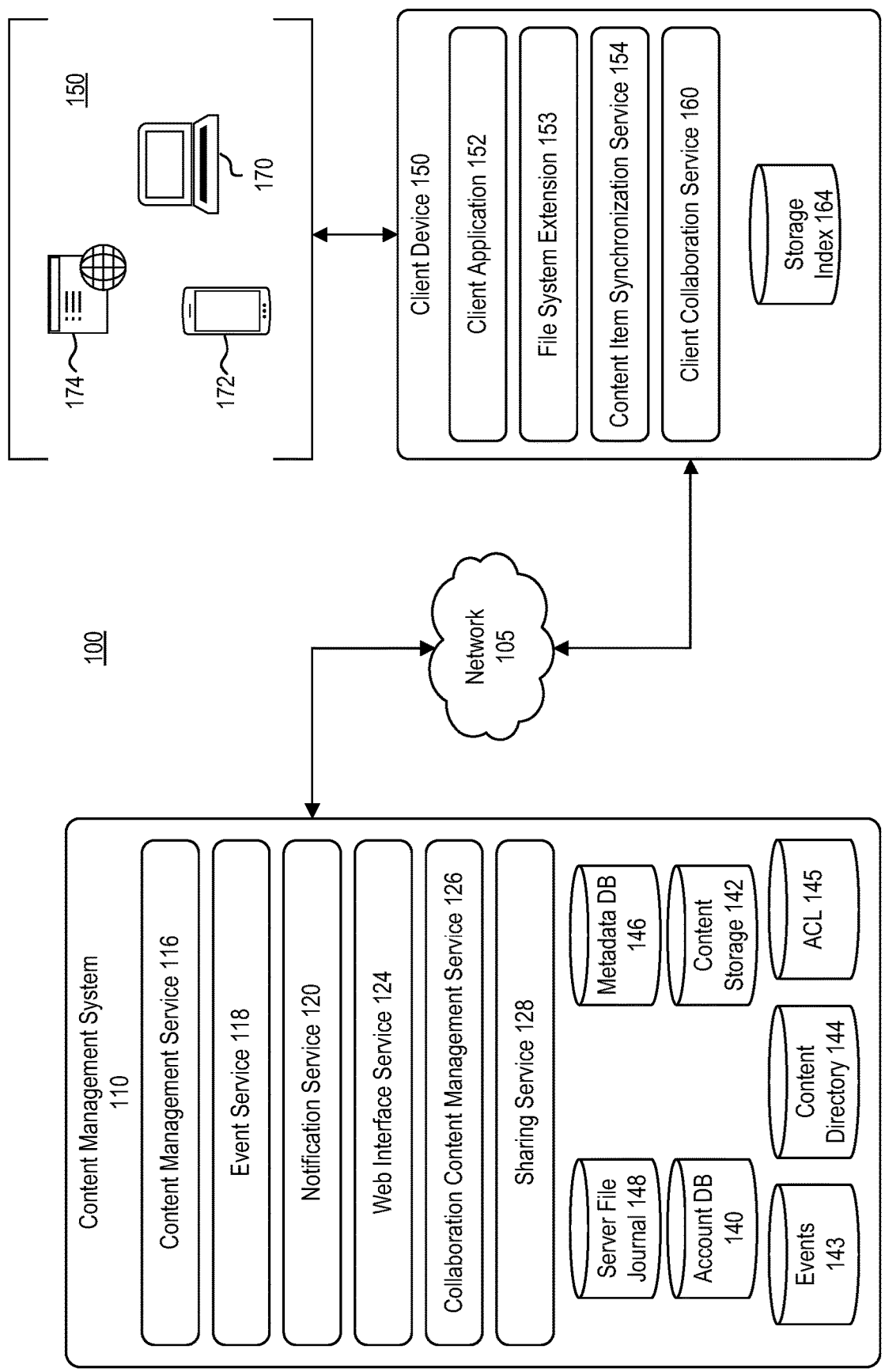
FIG. 1 illustrates an example system configuration of a content management system and client devices, according to example embodiments.

FIG. 1 is a block diagram illustrating a configuration of system 100, according to example embodiments. System 100 may include a content management system 110 interacting with a client device 150.

Content management system 110 may include one or more components. For example, as illustrated, content management system 110 may include content management service 116, event service 118, notification service 120, web interface service 124, collaboration content management service 126, and sharing service 128. In some embodiments, content management system 110 may further include one or more storage items. Such storage items may include, but are not limited to, server file journal 148, account database 140, events 143, content directory 144, access control list (ACL) 145, content storage 142, and metadata database 146.

Content management system 110 may communicate with client device 150 via network 105. Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in system 100 to send and receiving information between the components of system 100.

Client device 150 may include one or more components. For example, as illustrated, client device 150 may include client application 152, content item synchronization service 154, file system extension 153, and client collaboration service 160. In some embodiments, client device 150 may further include one or more storage components. As illustrated, client device 150 may include storage index 164.

Accounts

Content management system 110 can store content items in association with accounts, as well as perform a variety of content item management tasks, such as retrieve, modify, browse, and/or share the content item(s) (e.g., collaboration documents). Furthermore, content management system 110 can enable an account to access collaboration document(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of collaboration documents while an engineering group can have access to another set of collaboration documents. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, messages, etc. A content item can also include collections or other mechanisms for grouping content items together with different behaviors, such as folders, zip files, playlists, albums, etc. A collection can refer to a folder, or a plurality of content items that are related or grouped by a common attribute. Content items can also include hyperlinks, shortcuts or placeholder files storing metadata identifying other content items, such as other content items stored on content management system 110 or on a third-party content management system. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 can be a computing device having a local file system accessible by multiple applications resident thereon. Client device 172 can be a computing device wherein content items are only accessible to a specific application or by permission given by the specific application, and the content items are stored either in an application specific space or in the cloud. Client device 174 can be any client device accessing content management system 110 via a web browser and accessing content items via a web interface. While example client devices 170, 172, and 174 are depicted in form fusers such as a laptop, mobile device, or web browser, it should be understood that the descriptions thereof are not limited to devices of these example form fusers. For example, a mobile device such as client device 172 might have a local file system accessible by multiple applications resident thereon, or client device 172 might access content management system 110 via a web browser. As such, the form fuser should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 154.

Content item synchronization service 154 can be in communication with content management service 116 to synchronize changes to content items between client device 150 and content management system 110.

Client device 150 can synchronize content with content management system 110 via content item synchronization service 154. The synchronization can be platform agnostic. That is, content can be synchronized across multiple client devices of varying type, capabilities, operating systems, etc. Content item synchronization service 154 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, delete, add, modify, etc. commands relative to content items in the designated location of the file system of client device 150.

When file system extension 153 notices a write, move, copy, or delete command, it can notify content item synchronization service 154, which can synchronize the changes to content management system service 116. In some embodiments, content item synchronization service 154 can perform some functions of content management system service 116 including functions addressed above such as dividing the content item into blocks, hashing the content item to generate a unique identifier, etc. Content item synchronization service 154 can index content within storage index 164 and save the result in storage index 164. Indexing can include creating a unique identifier for each content item. In some embodiments, content item synchronization service 154 creates this unique identifier by putting the data of the content item (e.g., excluding the filename and/or other metadata) through a hash function; as addressed above, content management system can use a similar process to provide identifiers to content on content management system 110.

Content item synchronization service 154 can use storage index 164 to facilitate the synchronization of at least a portion of the content within client storage with content associated with a user account on content management system 110. For example, content item synchronization service 154 can compare storage index 164 with content management system 110 and detect differences between content on client storage and content associated with a user account on content management system 110. Content item synchronization service 154 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 120. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 154 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification.

Sometimes client device 150 might not have a network connection available. In this scenario, content item synchronization service 154 can monitor the linked collection for content item changes and queue those changes for later synchronization to content management system 110 when a network connection is available. Similarly, a user can manually start, stop, pause, or resume synchronization with content management system 110.

Content item synchronization service 154 can synchronize content associated with a particular user account on content management system 110. Alternatively, content item synchronization service 154 can selectively synchronize a portion of the content of the total content associated with the particular user account on content management system 110. Selectively synchronizing only a portion of the content can preserve space on client device 150 and save bandwidth.

In some embodiments, content item synchronization service 154 selectively stores a portion of the content associated with the particular user account and stores placeholder content items in client storage for the remainder portion of the content. For example, content item synchronization service 154 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 154 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 118 can generate an event for such interaction. When event service 118 detects a user interaction with a content item and/or another user, event service 118 can create an event identifier (e.g., unique event identifier) and event type, and associate the event identifier and event type with the user (e.g., user identifier and namespace identifier) to create an event or event record for the interaction. After the event is created, event service 118 can send the event identifier and any information associated with the event to events 143 for storage.

Events 143 can include one or more storage systems, such as one or more databases, for storing events and associated information. In some examples, events 143 can include a distributed database or distributed storage system. Events 143 can receive and store the event data for access by content management system 110.

Presence and Seen State

Content management system 110 can provide information about how users are interacting or have interacted with a content item, such as a shared content item. Content management system 110 can report that a user with whom a content item is shared is currently viewing the content item. For example, client collaboration service 160 can notify notifications service 120 when client device 150 is accessing the content item. Notify notifications service 120 can notify client devices of other users having access to the same content item of the presence of the user of client device 150 with respect to the content item. Content management system 110 (e.g., event service 118) and/or client device 150 can track user interactions with content, such as read or write events, and maintain a history of such events and interactions for a user (e.g., events 143).

Content management system 110 can report a history of user interactions with a shared content item. Collaboration content management service 126 can query data sources such as events 143, metadata database 146, and server file journal 148 to determine that a user has saved the content item, that a user has yet to view the content item, etc., and disseminate this status information using notification service 120 to other users so that they can know who currently is or has viewed or modified the content item.

Collaboration content management service 126 can facilitate comments associated with content, even if a content item does not natively support commenting functionality. Such comments can be stored in metadata database 146.

Collaboration content management service 126 can originate and transmit notifications for users. For example, a user can mention another user in a comment and Collaboration content management service 126 can send a notification to that user that he has been mentioned in the comment. Various other content item events can trigger notifications, including deleting a content item, sharing a content item, etc.

Collaboration content management service 126 can provide a messaging platform whereby users can send and receive instant messages, voice calls, emails, etc.

Collaboration Content Items

Collaboration content management service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. In addition, in some embodiments, some portions or components of content management system 110 described herein may be included in or integrated with one or more client devices 150. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
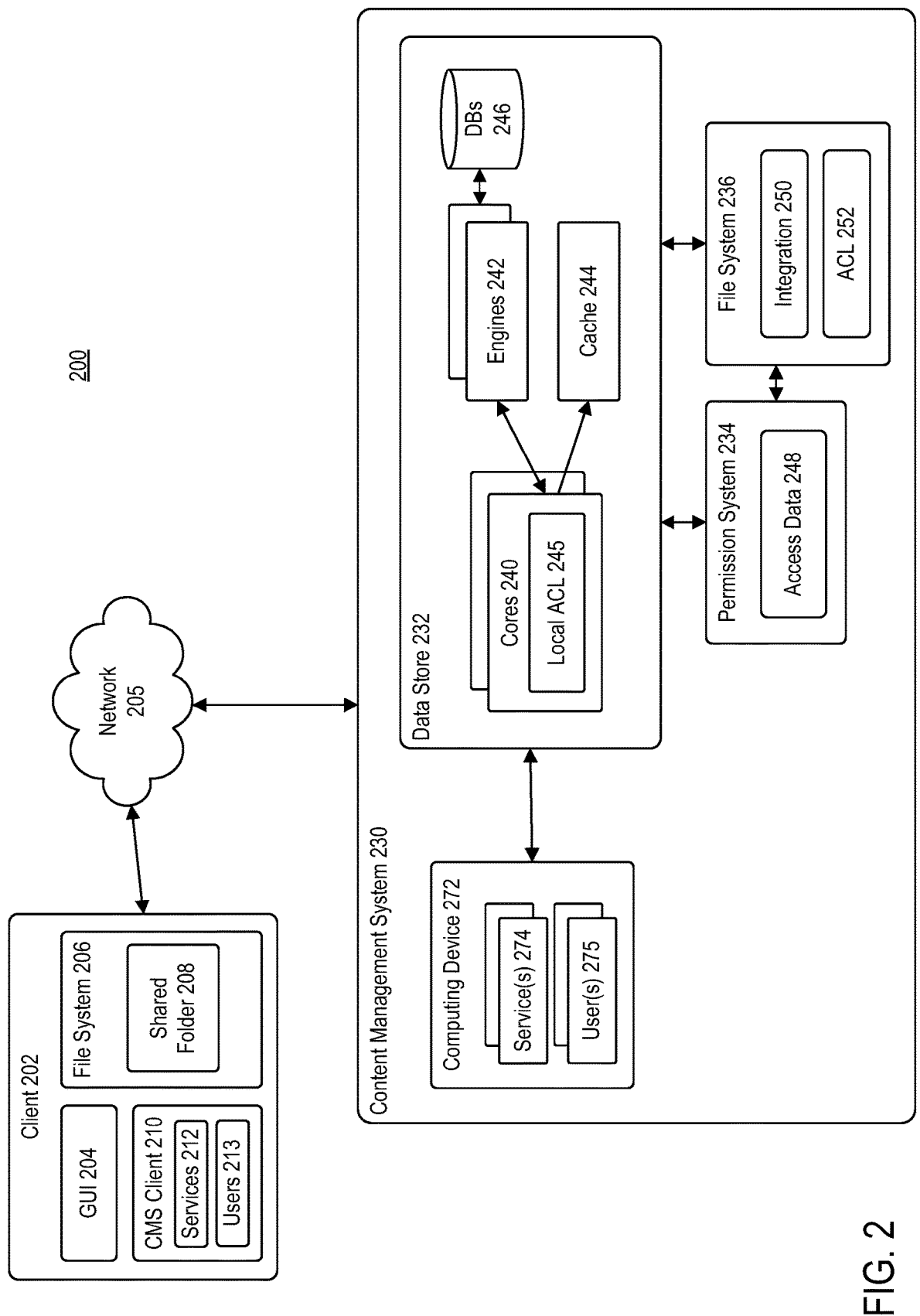
FIG. 2 illustrates an example system configuration of the content management system and client devices of FIG. 1, according to example embodiments.

FIG. 2 is a block diagram of an example system 200, according to example embodiments. For example, system 200 may correspond to system 100 described above. As illustrated, system 200 may include client 202, content management system 230, and computing device 272 communicating via network 205 (similar to network 105).

A user of client 202 (e.g., client device 150) may be associated with content management system 110. Client 202 may include a graphical user interface (GUI) 204, a file system 206, and a content management system (CMS) client 210. In some embodiments, user of client 202 may have access to content management system 230. For example, user of client 202 may be representative of an engineer or employee of an entity associated with content management system 230. In this manner, user of client 202 may have access to the programming code underlying content management system 230.

In some embodiments, user of client 202 may be representative of an end user accessing functionality of content management system 230. For example, user of client 202 may view one or more content items (e.g., files, links, folders, workspaces, etc.) associated with the user's account via GUI 204. For example, GUI 204 may provide user of client 202 with access to content items associated with the user's account. In some embodiments, GUI 204 may provide a file structure overview. Via GUI 204, user of client 202 may view, edit, modify, and otherwise interact with content items.

In some implementations, client 202 may include file system 206. For example, file system 206 may be representative of a portion (e.g., a dedicated folder) of the file system of client 202 that includes content items being managed by content management system 110. In some embodiments, content items stored in file system 206 may be automatically uploaded to or synchronized with file systems in content management system 110 and/or managed file systems on other user devices. As illustrated, in some embodiments, file system 206 may include shared folder 208. Shared folder 208 may be accessed by a user of client 202, as well as collaborators of the user.

In some implementations, client 202 may further include CMS client 210. For example, CMS client 210 (referenced to as content item synchronization service 154) may manage file system 206. When a user adds a content item to file system 206, CMS client 210 may communicate with content management system 230 to synchronize the content item with content management system 230, as described with reference to FIG. 1 above. Similarly, CMS client 210 may monitor items in file system 206 to determine when content items may have been opened, modified, moved, shared, deleted, etc., and which user has performed or is performing operations on the content items within file system 206.

In some embodiments, CMS client 210 may include one or more services 212 and/or one or more users 213. Each service 212 may be associated with content management system 230. For example, one or more services 212 may work in conjunction to manage data associated with client 202 on content management system 230. In another example, one or more services 212 may allow a user to perform operations on the programming code underlying aspects of content management system 230, such as, but not limited to, debugging programming code associated with content management system 230.

Content management system 230 may include a data store 232, a permission system 234, a file system 236, and one or more computing devices 272. In some embodiments, data store 232, permission system 234, file system 236, and computing device 272 may communicate via one or more local network (not shown).

Data store 232 may be representative of a metadata store that supports various services hosted by content management system 230. For example, as provided in FIG. 1, data store 232 may be representative of a metadata store that supports one or more of at least content management service 116, event service 118, notification service 120, web interface service 124, collaboration content management service 126, and/or sharing service 128. Data store 232 may be configured to store sensitive user information such as, but not limited to, user personal identification information, use comments, file history, shared link data, and the like. More generally, data store 232 may be representative of an abstraction layer on top of various databases accessed by content management system 230. Due to the vast amount of data stored in association with content management system 230, it is often difficult for services or users to correctly query databases 246. Accordingly, rather than communicate with databases 246 directly, services or users may communicate with data store 232 which may, in turn, translate the request into a format compatible with databases 246 to provide results to services or users.

Data store 232 may include one or more cores 240, one or more engines 242, a cache 244, and a plurality of databases 246. Cores 240 may be representative of one or more stateless layers responsible for receiving one or more request from client 202 and routing or forwarding the request to an appropriate engine 242. For example, client 202 may communicate with cores 240 via one or more software development kits (SDKs) stored thereon. In some embodiments, the SDKs may implement one or more application programming interfaces (APIs) associated with data store 232. In some embodiments, the requests may take the form of one or more request procedure calls (RPCs). The request may specify at least the requested data, a data type associated with the requested data, and a service that initiated the request.

Upon receiving the request, cores 240 may be configured to determine whether to grant the request based on the parameters defined in the request. For example, cores 240 may determine whether to grant the request based on the requestor (e.g., service or user) and the data type specified in the request. In this manner, cores 240 may limit requestor access to databases 246 based on the requestor and the data type for which the requestor is seeking access.

To determine whether a particular user or service is allowed to access certain data types, cores 240 may be configured to interface with file system 236. File system 236 may work in conjunction with permission system 234. Permission system 234 may be configured to allow administrators to set various permissions (e.g. access data 248) on which services are allowed to access certain types of data. Rather than require cores 240 to continually communicate with permission system 234, file system 236 may include an integration 250 that takes a snapshot of the permission data on permission system 234 and converts the permission data to a format more easily readable by cores 240. Accordingly, integration 250 may generate an access control list (ACL) 252 stored in file system 236 and accessible by cores 240.

Referring back to cores 240, cores 240 may access ACL 252 hosted by file system 236. In some embodiments, cores 240 may access ACL 252 upon start-up to retrieve an up-to-date version of permissions. In some embodiments, cores 240 may periodically communicate with file system 236 to determine whether ACL 252 has been updated. In this manner, cores 240 may have access to a most recent version of the permissions, as specified in ACL 252. In some embodiments, cores 240 may save a local version of ACL 252 (e.g., local ACL 245). In this manner, rather than continuously communicate with file system 206 every time cores 240 receives a request from a service or user, cores 240 may access local ACL 245 to grant or deny a request, thus minimizing system latency.

Upon determining that an incoming request is valid (i.e., the requesting service or user is permitted to access the data type specified in the request), cores 240 may forward the request to a respective engine 242. Engines 242 may be configured to translate requests transmitted to cores 240 into a format compatible with databases 246 (e.g., MySQL). In some embodiments, one or more engines 242 may be associated with one or more databases 246. For example, cores 240 may maintain a record of which data is stored in each database 246. When forwarding the request to a respective engine 242, cores 240 may transmit or forward to request to an engine 242 that is associated with a database 246 where the requested data is stored. Once the request is received by a respective engine 242, engine 242 may translate the request into an appropriate format in order to retrieve the requested data from a respective database 246. In this manner a requestor can request data from data store 232 without requiring knowledge of where in the plurality of databases 246 the data is stored.

In some embodiments, upon determining that the incoming request is valid (i.e., the requesting service or user is permitted to access the data type specified in the request), cores 240 may access cache 244. For example, cores 240 may access cache 244 to minimize latency for certain data requests.

In some embodiments, rather than receive a request via client 202, data store 232 may receive a request via one or more computing devices 272. One or more computing devices 272 may include one or more services 274 executing thereon. Similar to the operations discussed above with respect to requests transmitted by client 202 or services 212 executing on client 202, services 274 may similarly send data requests to data store 232 for processing. For example, in some embodiments, rather than CMS client 210 communicating directly with data store 232, CMS client 210 may communicate with a respective service 274, which may, in turn, communicate the request to data store 232 for processing.

Accordingly, a user submitting a request to data store 232 may be representative of client 202, service 212 executing on client 202, computing device 272, or service 274 executing on computing device 272.

Figure 3A:
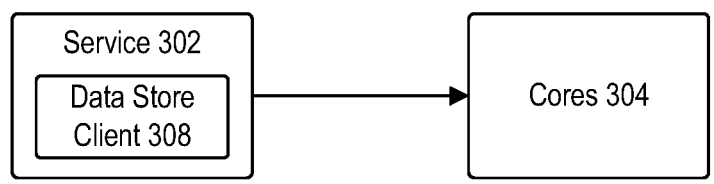
FIG. 3A is a block diagram illustrating communication between a service and cores, according to example embodiments.

FIG. 3A is a block diagram illustrating communication between a service 302 and cores 304, according to example embodiments. As shown, service 302 may be representative of a service associated with content management system 110. In some embodiments, service 302 may be representative of a service executing on a client device (e.g., client 202). In some embodiments, service 302 may be representative of a service executing on a computing device associated with content management system 110 (e.g., computing device 272).

Service 302 may include a local data store client 308 executing thereon. Local data store client 308 may be representative of a software module that facilitates communication between service 302 and data store 232. For example, via local data store client 308, service 302 may transmit a request to data store 232 for data stored therein. In some embodiments, the request may include at least the requested data, the requested data type, and an identifier associated with the service (e.g., service 302) initiating the request. In some embodiments, the request may specify whether the request is a read request (e.g., GET) or a write request (e.g., POST). In some embodiments, service 302 may transmit a plurality of requests simultaneously.

Upon receiving the request, cores 304 may parse each data request to identify at least the data type (e.g., the type of the requested data) and service identifier (e.g., an identifier of the service issuing the request). Cores 304 may compare the data type and service identifier to an ACL (e.g., local ACL 245) to determine if service 302 is permitted to access that data type. In some embodiments, cores 304 may also determine whether service 302 is permitted to perform a type of request that was submitted. For example, service 302 may be permitted to read data associated with the specified data type but may not be permitted to write that data type to content management system 230. If cores 304 determines that the request is valid (e.g., service 302 is able to perform the type of data request (e.g., read or write) for the specified data type), then cores 304 may forward the request to engine 242 for processing. If, however, cores 304 determine that the request is not valid (e.g., service 302 is not able to perform the type of data request (e.g., read or write) for the specified data type), then cores 304 may reject the request.

Figure 3B:
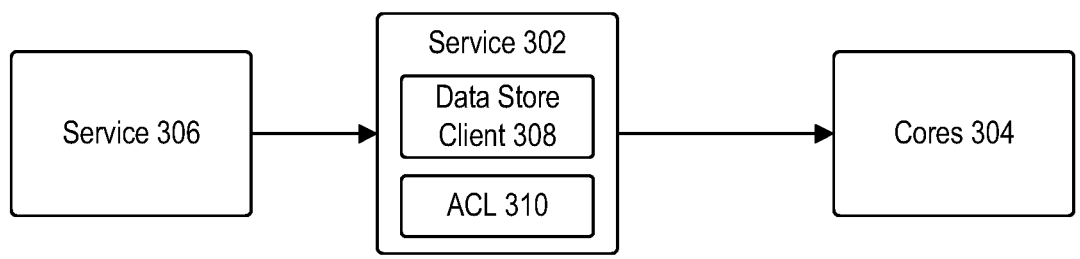
FIG. 3B is a block diagram illustrating communication between a service and service and between service and cores, according to example embodiments.

FIG. 3B is a block diagram illustrating communication between a service 302 and service 306 and between service 302 and cores 304, according to example embodiments. In some embodiments, such as that shown in FIG. 3B, a service may not communicate directly with data store 232. Instead, service 306 may communicate a request directly to service 302, which may, in turn, forward the request to cores 304. In such embodiments, service 302 may further include an access control list (ACL) 310. ACL 310 may allow service 302 to act as an additional gatekeeper to data store 232. For example, ACL 310 may include permissions that define which services can request which data types in data store 232. In some embodiments, service 302 and/or service 306 may be representative of a service executing on a client device (e.g., client 202). In some embodiments, service 302 and/or service 306 may be representative of a service executing on a computing device associated with content management system 110 (e.g., computing device 272).

In operations, service 302 may receive a request from service 306. In some embodiments, the request may include at least the requested data, the requested data type, and an identifier associated with the service (e.g., service 302) initiating the request. In some embodiments, the request may specify whether the request is a read request (e.g., GET) or a write request (e.g., POST). In some embodiments, service 302 may transmit a plurality of requests simultaneously.

Upon receiving the request, service 302 may parse each request to identify at least the data type and service identifier contained therein. Service 302 may compare the data type and service identifier to ACL 310 to determine if service 306 is permitted to access that data type. In some embodiments, service 302 may also determine whether service 306 is permitted to perform a type of request that was submitted. For example, service 306 may be permitted to read data associated with the specified data type but may not be permitted to write that data type to content management system 230. If service 302 determines that the request is valid (e.g., service 306 is able to perform the type of data request (e.g., read or write) for the specified data type), then service 302 may forward the request to cores 304 for further processing. If, however, service 302 determines that the request is not valid (e.g., service 306 is not able to perform the type of data request (e.g., read or write) for the specified data type), then service 302 may reject the request.

Upon receiving the request, cores 304 may parse each data request to identify at least the data type and service identifier. Cores 304 may compare the data type and service identifier to an ACL (e.g., local ACL 245) to determine if service 302 is permitted to access that data type. In some embodiments, cores 304 may also determine whether service 302 is permitted to perform a type of request that was submitted. For example, service 302 may be permitted to read data associated with the specified data type but may not be permitted to write that data type to content management system 230. If cores 304 determines that the request is valid (e.g., service 302 is able to perform the type of data request (e.g., read or write) for the specified data type), then cores 304 may forward the request to engine 242 for processing. If, however, cores 304 determines that the request is not valid (e.g., service 302 is not able to perform the type of data request (e.g., read or write) for the specified data type), then cores 304 may reject the request.

FIG. 4A is a block diagram illustrating an access control list (ACL) 402, according to example embodiments. ACL 402 may be representative of access control list 252 on file system 236 and/or local ACL 245.

As shown, ACL 402 may include permission information regarding user or service interaction with data types stored in database 246 of data store 232. For example, ACL 402 may include a first table 404 and a second table 406. First table 404 may store information associated with read data requests. Second table 406 may store information associated with write data requests. Each table 404, 406 may include at least a first column 408 corresponding to a service or user ID (e.g., Service 1, Service 2, User 1, etc.) and a second column 410 corresponding to a data type (e.g., Type 1, Type 2, ..., Type N). Each service or user ID may be mapped to at least one data type. In some embodiments, a service or user ID may be mapped to multiple data types, i.e., that service or user may submit read request for multiple data types.

In operation, upon receiving a read request for a data type, cores 304 may identify the service or user identifier (e.g., an identifier of the service issuing the request) in the request and reference ACL 402 to determine whether the user or service corresponding to the user or service identifier is permitted to access the data type.

FIG. 4B is a block diagram illustrating an access control list (ACL) 432, according to example embodiments. ACL 432 may be representative of access control list 252 on file system 236 and/or local ACL 245.

As shown, ACL 432 may include permission information regarding user or service interaction with data types stored in database 246 of data store 232. For example, ACL 432 may define permissions on a user or service basis. For example, as shown, ACL 432 may include a plurality of tables (e.g., first table 434, a second table 436, and third table 438). First table 434 may store information associated with user or service 1. Each table 434-438 may include at least a first column 440 corresponding to a type of data request (e.g., read request, write request) and a second column 452 corresponding to a data type (e.g., Type 1, Type 2, ..., Type N) a respective user or service can interact with for that request. In some embodiments, a service or user ID may be granted read or write permissions to multiple data types.

In operation, upon receiving a read request for a data type, cores 304 may identify the service or user identifier (e.g., an identifier of the service issuing the request) in the request and reference ACL 432 to determine whether the user or service corresponding to the user or service identifier is permitted to access the data type.

Figure 4C:
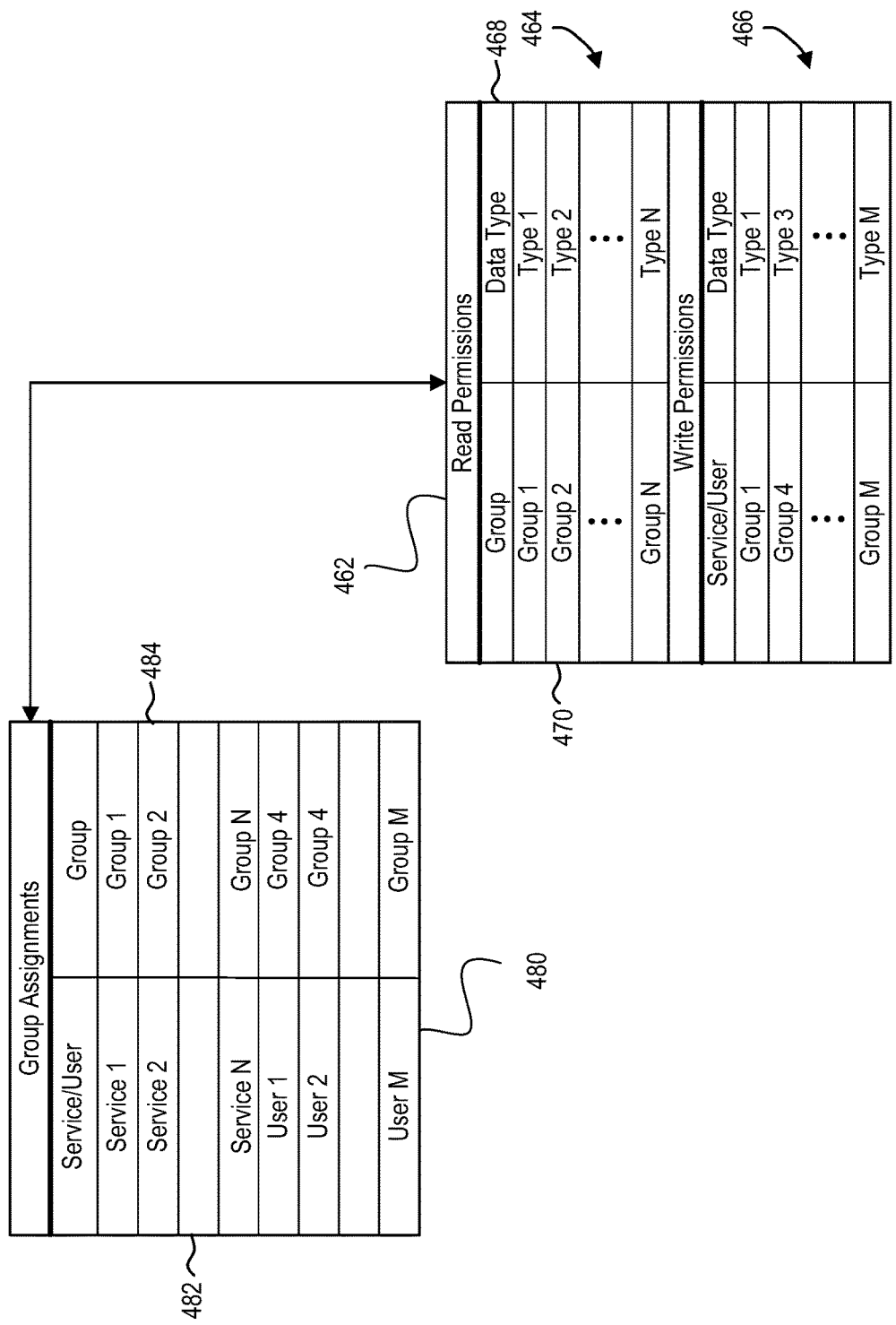
FIG. 4C is a block diagram illustrating an access control list and a group assignment table, according to example embodiments.

FIG. 4C is a block diagram illustrating an access control list (ACL) 462 and a group assignment table 480, according to example embodiments. ACL 462 may be representative of access control list 252 on file system 236 and/or local ACL 245.

In some embodiments, such as that shown in ACL 462, permissions may be defined per user or service group. For example, as shown, ACL 462 may a first table 464 and a second table 466. First table 464 may store information associated with read data requests. Second table 455 may store information associated with write data requests. Each table 464, 466 may include at least a first column 468 corresponding to a group ID (e.g., Group 1, Group 2, ..., Group N) and a second column 470 corresponding to a data type (e.g., Type 1, Type 2, ..., Type N). Each group ID may be mapped to at least one data type. In some embodiments, a group ID may be mapped to multiple data types, i.e., services or users associated with that group ID may submit read request for multiple data types.

In some embodiments, ACL 462 may be linked to a group assignment table 480. In some embodiments, group assignment table 480 may be stored in parallel to ACL 462 in permission system 234. In some embodiments, a snapshot of group assignment table 480 may be stored locally in data store 232. Group assignment table 480 may include information regarding the group or groups assigned to each service or user. As shown, group assignment table 480 may include at least a first column 482 corresponding to a service or user ID (e.g., Service 1, Service 2, User 1, etc.) and a second column 484 corresponding to a group ID (e.g., Group 1, Group 2, ..., Group N). In some embodiments, a service or user ID may be mapped to multiple group IDs.

In operation, upon receiving a data request for a data type, cores 304 may identify the service or user identifier (e.g., an identifier of the service issuing the request) in the request and reference group assignment table 480 to identify a group assigned to the service or user identifier. Once cores 304 determine the group identifier corresponding to the service or user identifier, cores 304 may access ACL 462 to determine whether the group identifier corresponds to a group permitted to access the data type.

Although not shown, those skilled in the art understand that any of ACL 402, ACL 432, or ACL 472 may include one or more additional parameters for granting or rejecting a read or write request. For example, any of ACL 402, ACL 432, or ACL 472 may include a column defining a time frame in which access to the data type is permissible. In another example, any of ACL 402, ACL 432, or ACL 472 may include a column defining a last modified date, allowing an end user to determine when service access to a data type was changed. In another example, any of ACL 402, ACL 432, or ACL 472 may include a first column that defines a maximum number of data requests and a second column that maintains a counter of the data requests. In other words, a service may be limited to 10 write requests every 30 seconds.

Figure 5:
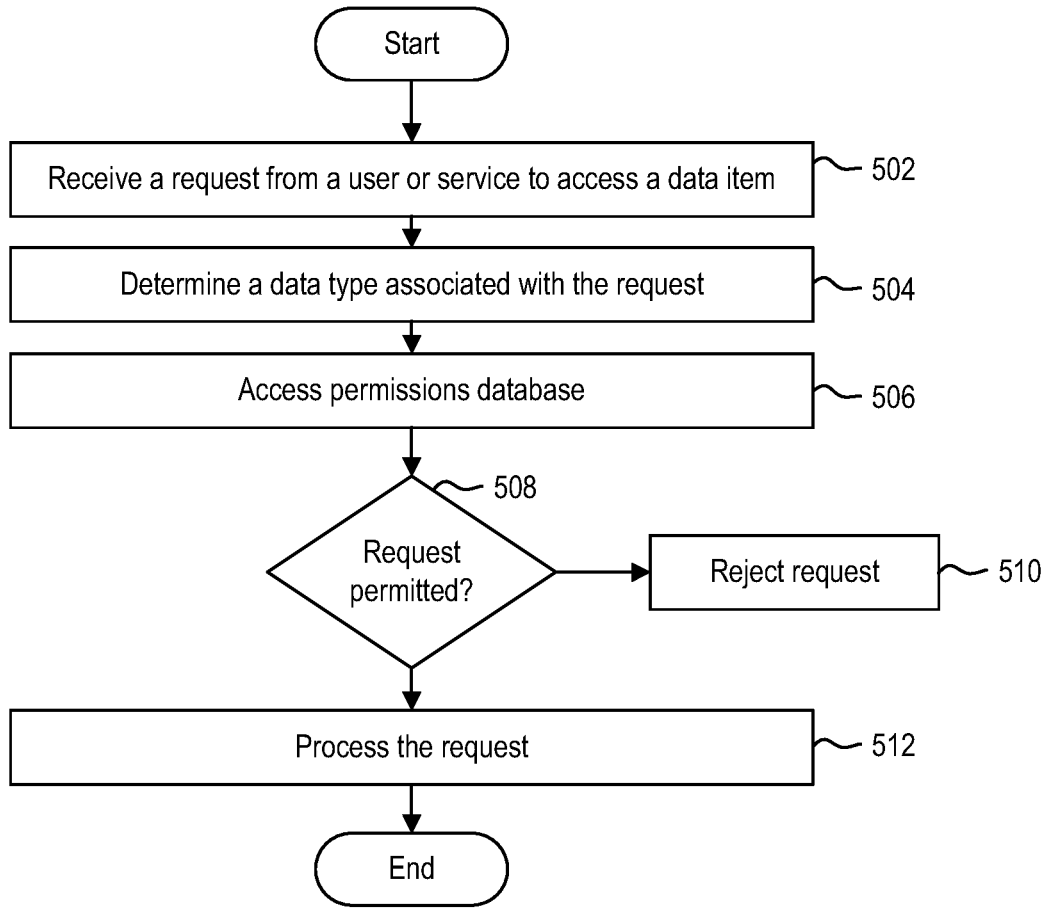
FIG. 5 is a flow diagram illustrating a method of controlling access to data items stored in a data store, according to example embodiments.

FIG. 5 is a flow diagram illustrating a method 500 of controlling access to data items stored in data store 232, according to example embodiments. Method 500 may begin at step 502.

At step 502, data store 232 may receive a request from a user (e.g., client 202, user 275, or service 274) to interact with a database 246 associated with data store 232. For example, data store 232 may receive a request from a user to access a data item stored database 246 of data store 232. In some embodiments, cores 240 may receive the request from client 202. In some embodiments, cores 240 may receive the request from service 274 or user 275. Generally, the request may include one or more parameters associated therewith. For example, the request may include one or more of a specification of the type of request (e.g., read request, write request, etc.), an indication of the data type being requested, and an identifier associated with the user submitting the request. In some embodiments, the request may take the form of a remote procedure call.

At step 504, data store 232 may determine a data type associated with the request. For example, cores 240 may parse the request to determine the data type associated with the data item specified in the request. The data type may dictate whether the requesting user or service (e.g., client 202, service 274, etc.) is permitted to access the data type.

At step 506, data store 232 may access permissions associated with data store 232. In some embodiments, cores 240 may interact with local ACL 245 residing in cores 240. In some embodiments, cores 240 may communicate with file system 236 to access permissions associated with data store 232. Communicating with file system 236 may allow cores 240 to access an updated or current version of ACL 252.

At step 508, data store 232 may determine whether to grant the request submitted by the user or service. For example, at step 508, cores 240 may determine whether data store 232 is able to perform the request submitted by the user or service. In some embodiments, determining whether data store 232 is able to perform the request may include cores 240 comparing the one or more parameters in the request to local ACL 245 or ACL 252. For example, cores 240 may determine whether the requesting user or service is able to access the data type specified in the request. In some embodiments cores 240 may determine whether data store 232 is able to perform the request specified by the user or service. For example, cores 240 may determine that the requesting user or service is able to read data from data store 232 but is unable to write data to data store 232.

If at step 508, data store 232 determines that the request is invalid (e.g., the user or service is unable to submit the request for the specified data type), then method 500 may proceed to step 510. At step 510, data store 232 may reject the request. In some embodiments, data store 232 may notify the requesting user or service of the rejection.

If, however, at step 508, data store 232 determines that the request is valid (e.g., the user or service is able to submit the request for the specified data type), then method 500 may proceed to step 512. At step 512, data store 232 may process the request. In some embodiments, processing the request may include cores 240 forwarding the request to an appropriate engine 242 that manages databases 246 associated with the specified data type. In some embodiments, processing the request may include cores 240 communicating with cache 244, depending on the request type and the data type.

Figure 6:
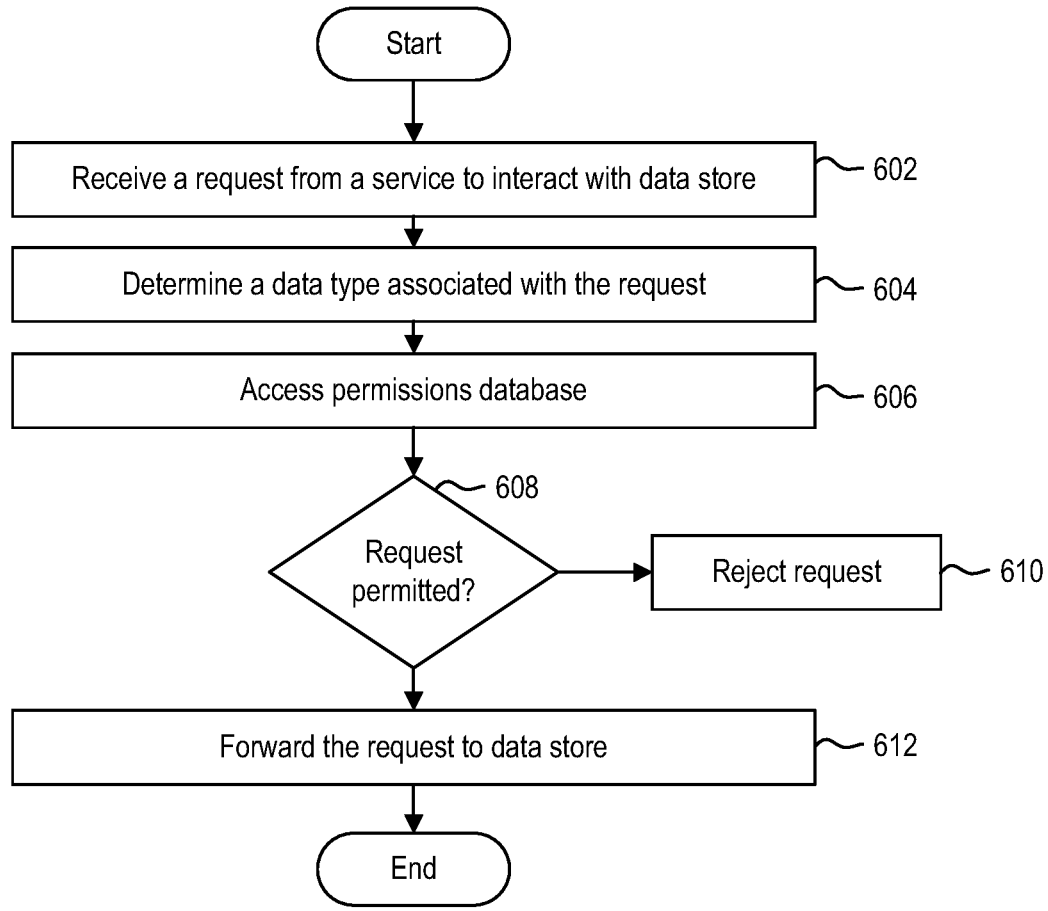
FIG. 6 is a flow diagram illustrating a method of controlling access to data items stored in a data store, according to example embodiments.

FIG. 6 is a flow diagram illustrating a method 600 of controlling access to data items stored in data store 232, according to example embodiments. Method 600 may begin at step 602.

At step 602, service 302 may receive a request from another service 306 to interact with a database 246 associated with data store 232. In some embodiments, the request may include one or more parameters associated therewith. For example, the request may include one or more of a specification of the type of request (e.g., read request, write request, etc.), an indication of the data type being requested, and an identifier associated with service 306. In some embodiments, the request may take the form of a remote procedure call.

At step 604, service 302 may determine a data type associated with the request. For example, service 302 may parse the request to determine the data type specified in the request. The data type may dictate whether requesting service 306 is permitted to access the data type.

At step 606, service 302 may access permissions associated with data store 232. In some embodiments, service 302 may interact with ACL 310. In some embodiments, service 302 may communicate with file system 236 to access permissions associated with data store 232. Communicating with file system 236 may allow service 302 to access an updated or current version of ACL 252.

At step 608, service 302 may determine whether to grant the request submitted by service 306. For example, at step 608, service 302 may determine whether service 306 is permitted to submit the request to data store 232. In some embodiments, determining whether service 306 may be able to submit the request to data store 232 may include service 302 comparing the one or more parameters in the request to ACL 310 or ACL 252. For example, service 302 may determine whether service 306 may be able to access the data type specified in the request. In some embodiments, service 302 may determine whether data store 232 is able to perform the request specified by service 306. For example, service 302 may determine that the service 306 may be able to read data from data store 232 but is unable to write data to data store 232.

If at step 608, service 302 determines that the request is invalid (e.g., service 306 is unable to submit the request for the specified data type), then method 600 may proceed to step 610. At step 610, service 302 may reject the request. In some embodiments, service 302 may notify service 306 of the rejection.

If, however, at step 608, service 302 determines that the request is value (e.g., service 306 is able to submit the request for the specified data type), then method 600 may proceed to step 612. At step 612, service 302 may process the request. In some embodiments, processing the request may include service 302 forwarding the request from service 306 to cores 240 for subsequent processing in accordance with the operations discussed above in conjunction with FIGS. 5-6.

FIG. 7A illustrates an architecture of system bus computing system 700, according to example embodiments. One or more components of system 700 may be in electrical communication with each other using a bus 705. System 700 may include a processor (e.g., one or more CPUs, GPUs or other types of processors) 710 and a system bus 705 that couples various system components including the system memory 715, such as read only memory (ROM) 720 and random access memory (RAM) 725, to processor 710.

System 700 can include a cache of high-speed memory connected directly with, in close proximity to, or integrated as part of processor 710. System 700 can copy data from memory 715 and/or storage device 730 to cache 712 for quick access by processor 710. In this way, cache 712 may provide a performance boost that avoids processor 710 delays while waiting for data. These and other modules can control or be configured to control processor 710 to perform various actions. Other system memory 715 may be available for use as well. Memory 715 may include multiple different types of memory with different performance characteristics. Processor 710 may be representative of a single processor or multiple processors. Processor 710 can include one or more of a general purpose processor or a hardware module or software module, such as service 1 732, service 2 734, and service 3 736 stored in storage device 730, configured to control processor 710, as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the system 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms (e.g., a display) known to those of skill in the art. In some instances, multimodal systems can enable a user to provide multiple types of input to communicate with system 700. Communications interface 740 can generally govern and manage the user input and system output. There is no restriction on operating on any particular hardware arrangement and therefore the basic features here may easily be substituted for improved hardware or firmware arrangements as they are developed.

Storage device 730 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 can include services 732, 734, and 736 for controlling the processor 710. Other hardware or software modules are contemplated. Storage device 730 can be connected to system bus 705. In one aspect, a hardware module that performs a particular function can include the software component stored in a computer-readable medium in connection with the necessary hardware components, such as processor 710, bus 705, output device 735, and so forth, to carry out the function.

FIG. 7B illustrates a computer system 750 having a chipset architecture that can be used in executing the described method and generating and displaying a graphical user interface (GUI). Computer system 750 may be an example of computer hardware, software, and firmware that can be used to implement the disclosed technology. System 750 can include one or more processors 755, representative of any number of physically and/or logically distinct resources capable of executing software, firmware, and hardware configured to perform identified computations. One or more processors 755 can communicate with a chipset 760 that can control input to and output from one or more processors 755. In this example, chipset 760 outputs information to output 765, such as a display, and can read and write information to storage device 770, which can include magnetic media, and solid state media, for example. Chipset 760 can also read data from and write data to storage device 775 (e.g., RAM 775). A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 755 analyzing data stored in storage device 770 or 775. Further, the machine can receive inputs from a user through user interface components 785 and execute appropriate functions, such as browsing functions by interpreting these inputs using one or more processors 755.

It can be appreciated that example systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method, comprising:
   receiving, by a content management system, a first request from a service executing on a computing system associated with the content management system, the first request to access a first data item stored on a first server of the content management system;
   determining, by the content management system, a first data type associated with the first data item;
   accessing, by the content management system, an access control list to determine whether the service has permission to access data associated with the first data type;
   based on a first determination that the service has permission to access data associated with the first data type, processing, by the content management system, the first request;
   receiving, by the content management system, a second request from the service executing on the computing system to access a second data item stored on the first server of the content management system;
   determining, by the content management system, a second data type associated with the second data item;
   accessing, by the content management system, the access control list to determine whether the service has permission to access data associated with the second data type; and
   based on a second determination that the service does not have permission to access data associated with the second data type, rejecting, by the content management system, the second request.

2. The method of claim 1, wherein accessing, by the content management system, the access control list to determine whether the service has permission to access data associated with the first data type comprises:
   determining a first request type associated with the first request; and
   determining that the service is permitted to submit the first request type.

3. The method of claim 1, wherein accessing, by the content management system, the access control list to determine whether the service has permission to access data associated with the first data type comprises:
   accessing a group assignment table to determine a group of services to which the service is associated; and
   determining whether the group to which the service is associated has permission to access data associated with the first data type.

4. The method of claim 1, wherein accessing, by the content management system, the access control list comprises:
   communicating with a remote file system to obtain an updated access control list; and
   replacing the access control list with the updated access control list.

5. The method of claim 1, wherein processing, by the content management system, the first request comprises:
   forwarding the first request to an engine associated with a database storing data associated with the first data type.

6. The method of claim 1, wherein processing, by the content management system, the first request comprises:
   writing data to the first data item stored in a database associated with the content management system.

7. A method, comprising:
   receiving, by a content management system, a first request from a first service executing on a computing system associated with the content management system, the first request to access a data item managed by the content management system;
   determining, by the content management system, a data type associated with the data item;
   accessing, by the content management system, an access control list to determine whether the first service has permission to access data associated with the data type;
   based on a first determination that the first service has permission to access data associated with the data type, providing, by the content management system, the data item to the first service;
   receiving, by the content management system, a second request from a second service executing on the computing system associated with the content management system, the second request to access the data item;
   accessing, by the content management system, the access control list to determine whether the second service has permission to access data associated with the data type; and
   based on a second determination that the second service does not have permission to access data associated with the data type, rejecting, by the content management system, the second request.

8. The method of claim 7, wherein accessing, by the content management system, the access control list to determine whether the first service has permission to access data associated with the data type comprises:
   determining a first request type associated with the first request; and
   determining that the first service is permitted to submit the first request type.

9. The method of claim 7, wherein accessing, by the content management system, the access control list to determine whether the first service has permission to access data associated with the data type, comprises:
   accessing a group assignment table to determine a group of users or services to which the first service is associated; and
   determining whether the group to which the first service is associated has permission to access data associated with the data type.

10. The method of claim 7, wherein accessing, by the content management system, the access control list comprises:

communicating with a remote file system to obtain an updated access control list that defines the access control list.

11. The method of claim 7, wherein processing, by the content management system, the first request comprises:
forwarding the first request to an engine dedicated to a database storing data associated with the data type.

12. The method of claim 7, wherein processing, by the content management system, the first request comprises:
writing data to the data item stored in a database associated with the content management system.

13. A non-transitory computer readable medium comprising instructions which, when executed by a computing system, cause the computing system to perform operations, comprising:
receiving, by a first server of a content management system, a request from a service executing on a computing system associated with the content management system, the request to access a data item managed by the content management system;
determining, by the first server, a data type associated with the requested data item;
accessing, by the first server, an access control list to determine whether the service has permission to access data associated with the data type; and
based on a determination that the service has permissions to access data associated with the data type, processing, by the first server, the request.

14. The non-transitory computer readable medium of claim 13, wherein receiving, by the first server of the content management system, the request from the service to access the data item managed by the content management system comprises:
receiving, by a first service executing on the first server, the request from the service, wherein the service is a second service executing on the computing system associated with the content management system.

15. The non-transitory computer readable medium of claim 14, wherein processing, by the first server, the request comprises:
forwarding, by the first service, the request to a data store associated with the content management system for processing.

16. The non-transitory computer readable medium of claim 15, further comprising:
receiving, by the first service, the data item from the data store; and
sending, by the first service, the data item to the second service.

* * * * *